US012322775B2

(12) United States Patent
Pettersson

(10) Patent No.: US 12,322,775 B2
(45) Date of Patent: Jun. 3, 2025

(54) TRACTION BATTERY THERMAL MANAGEMENT

(71) Applicant: FORD GLOBAL TECHNOLOGIES, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/406,404

(22) Filed: Jan. 8, 2024

(65) Prior Publication Data

US 2024/0154200 A1 May 9, 2024

Related U.S. Application Data

(62) Division of application No. 17/098,924, filed on Nov. 16, 2020, now Pat. No. 11,870,047.

(51) Int. Cl.
*H01M 10/633* (2014.01)
*H01M 10/613* (2014.01)
(Continued)

(52) U.S. Cl.
CPC ....... *H01M 10/633* (2015.04); *H01M 10/613* (2015.04); *H01M 10/615* (2015.04);
(Continued)

(58) Field of Classification Search
CPC ............. H01M 10/633; H01M 10/613; H01M 10/615; H01M 10/625; H01M 10/6556; H01M 10/6568; H01M 10/6571; H01M 2220/20; H01M 10/486; H01M 10/63; Y02E 60/10; Y02T 10/70; B60L 58/26; B60L 58/27

See application file for complete search history.

(56) References Cited

U.S. PATENT DOCUMENTS 5,678,410 A * 10/1997 Fujita .................. B60L 58/33
62/331
9,539,912 B2 1/2017 Li
(Continued)

FOREIGN PATENT DOCUMENTS

CN 202616362 U 12/2012
CN 105161776 A * 12/2015 ............ H01M 10/36
(Continued)

*Primary Examiner* — Kaity V Chandler
(74) *Attorney, Agent, or Firm* — David B Kelley; Brooks Kushman P.C.

(57) ABSTRACT

A vehicle includes a traction battery having a plurality of cells arranged in arrays and grouped into a plurality of cooling zones. A thermal management system includes a plurality of distinct circuits each associated with one of the zones. The thermal management system is configured to provide individual heating or cooling to each of the circuits to independently control temperatures of the zones. A controller is programmed to, in response to one of the zones exceeding a first threshold temperature and another of the zones being less a second threshold temperature, command the thermal management system to provide cooling to the circuit associated with the one of the zones and command the thermal management system to provide heating to the circuit associated with the another of the zones.

4 Claims, 4 Drawing Sheets

(51) Int. Cl.

| | |
|---|---|
| *H01M 10/615* | (2014.01) |
| *H01M 10/625* | (2014.01) |
| *H01M 10/6556* | (2014.01) |
| *H01M 10/6568* | (2014.01) |
| *H01M 10/6571* | (2014.01) |

(52) U.S. Cl.
CPC ..... *H01M 10/625* (2015.04); *H01M 10/6556* (2015.04); *H01M 10/6568* (2015.04); *H01M 10/6571* (2015.04); *H01M 2220/20* (2013.01)

(56) References Cited

U.S. PATENT DOCUMENTS

| | | |
|---|---|---|
| 9,673,492 B2 | 6/2017 | Nemesh et al. |
| 10,046,649 B2 | 8/2018 | Bertness |
| 2015/0200428 A1 | 7/2015 | Pekarssky et al. |
| 2015/0280294 A1 | 10/2015 | Shin et al. |
| 2016/0031288 A1 * | 2/2016 | Nishikawa .............. B60L 58/26 165/43 |
| 2017/0005371 A1 | 1/2017 | Chidester |
| 2017/0033417 A1 | 2/2017 | Basu et al. |
| 2017/0152957 A1 * | 6/2017 | Roche .................... B60L 58/26 |
| 2019/0329644 A1 * | 10/2019 | Ogura .................... B60K 11/02 |
| 2021/0066768 A1 | 3/2021 | Gao |

FOREIGN PATENT DOCUMENTS

| | | | |
|---|---|---|---|
| CN | 205194806 U * | 4/2016 | ............. Y02E 60/10 |
| CN | 207045140 U * | 2/2018 | ......... B60H 1/00007 |
| CN | 108736109 A | 11/2018 | |
| CN | 109546259 A * | 3/2019 | ......... H01M 10/613 |
| CN | 106058369 B | 6/2019 | |
| CN | 209479474 U * | 10/2019 | ............. Y02E 60/10 |
| CN | 210744096 U * | 6/2020 | ............. Y02E 60/10 |
| CN | 111923694 A * | 11/2020 | ......... B60H 1/00007 |
| DE | 102009035480 A1 * | 2/2011 | ......... H01M 10/613 |
| EP | 2637248 A1 | 9/2013 | |
| EP | 2642630 B1 | 6/2016 | |
| JP | 2020061244 A | 4/2020 | |
| WO | WO-2012144148 A1 * | 10/2012 | ......... H01M 10/486 |
| WO | 2020003693 A1 | 1/2020 | |

* cited by examiner

TRACTION BATTERY THERMAL MANAGEMENT

CROSS-REFERENCE TO RELATED APPLICATIONS

This application is a division of U.S. application Ser. No. 17/098,924, filed Nov. 16, 2020, now U.S. Pat. No. 11,870,047, issued Jan. 9, 2024, the disclosure of which is hereby incorporated in its entirety by reference herein.

TECHNICAL FIELD

The present disclosure relates to traction battery assemblies for motor vehicles, and more specifically to thermal management systems capable of providing individual heating/cooling to different zones of the battery.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high-voltage components, and may include an air or liquid thermal management system to control the temperature of the battery.

SUMMARY

According to one embodiment, a vehicle includes a traction battery having a plurality of cells arranged in arrays and grouped into a plurality of cooling zones. A thermal management system includes a plurality of distinct circuits each associated with one of the zones. The thermal management system is configured to provide individual heating or cooling to each of the circuits to independently control temperatures of the zones. A controller is programmed to, in response to one of the zones exceeding a first threshold temperature and another of the zones being less a second threshold temperature, command the thermal management system to provide cooling to the circuit associated with the one of the zones and command the thermal management system to provide heating to the circuit associated with the another of the zones.

According to another embodiment, a vehicle includes a traction battery having a plurality of cells grouped into a plurality of cooling zones and a plurality of temperatures sensors each associated with one of the zones and configured to output a signal indicative of a temperature of the associated zone. A thermal management system includes a plurality of distinct circuits each associated with one of the zones and having conduit configured to circulate coolant therethrough, a pump, and valves each connected between the pump and a corresponding one of the circuits such that flow rates of the coolant through each of the circuits are individually controlled by the valves. An associated controller is programmed to rank the zones hottest to coldest based on the signals of temperature sensors, and, in response to a temperature of the coldest zone exceeding an upper temperature threshold, reduce an opening of the valve associated with the coldest zone to reduce the flow rate therethrough and increase an opening of the valve associated with the hottest zone to increase the flow rate therethrough.

According to yet another embodiment, a traction battery assembly includes a traction battery including a plurality of cells and a thermal management system. The thermal management systems includes a plurality of distinct circuits each associated with a different subset of the cells and having conduit configured to circulate coolant therethrough and valves each having a first inlet connected to a heating loop, a second inlet connected to a cooling loop, and an outlet connected to a corresponding one of the circuits, wherein each valve includes a first position in which the outlet and the first inlet are in fluid communication to provide heating and a second position in which the outlet and the second inlet are in fluid communication to provide cooling.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
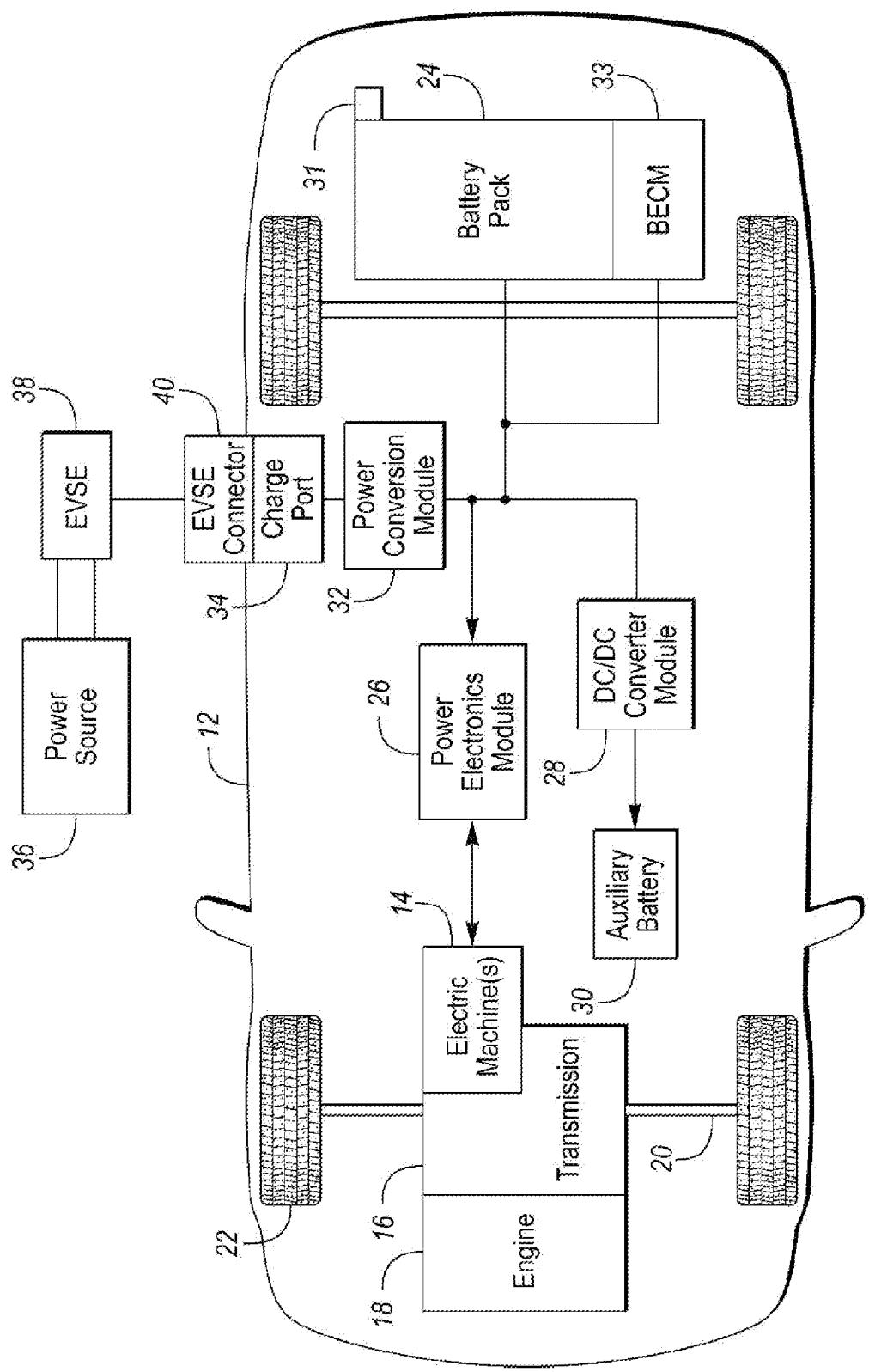
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air cooling systems, liquid cooling systems, and a combination of air and liquid systems.

The traction battery 24 may be electrically connected to one or more power-electronics modules 26 through one or more contactors (not shown). The one or more contactors isolate the traction battery 24 from other components when opened and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully electric vehicle. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12-volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have temperature sensors. The temperature sensors may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more controllers to control and monitor the operation of the components. The controllers, such as the BECM 33 and others, may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers.

The traction battery 24 and other vehicle components are thermally regulated with one or more thermal management systems. Example thermal management systems for a traction battery are shown in the figures and described below.

Figure 2:
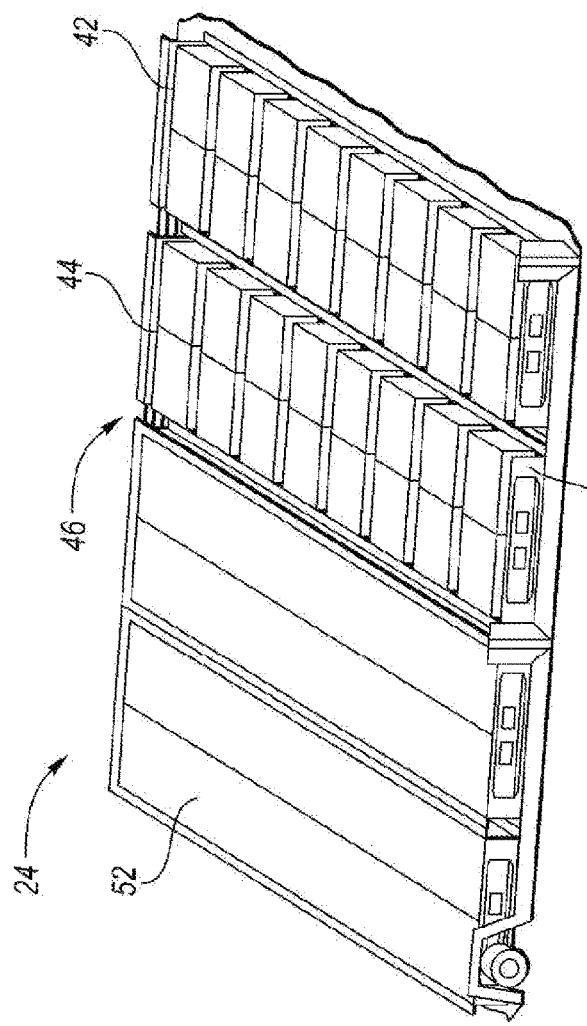
FIG. 2 is a perspective view of a traction battery according to one or more embodiments.

FIG. 2 illustrates the traction battery 24 with the cover and other components removed for illustrative purposes. The traction battery 24 includes a plurality of battery cells 42, such as lithium-ion or other chemistries. In the illustrated embodiment, the battery cells 42 are arranged in arrays 44. The arrays 44 may be a linear stack of cells 42. The arrays are arranged to form cell modules 48. In the illustrated embodiment, the battery 24 includes four modules 48. The cells 42 may be secured as arrays 44 and modules 48 through one or more types of support structure such as brackety 50. Each of the modules 48 may also include a top cover 52. (The cover has been omitted from two of the modules for illustrative purposes.)

The traction battery 24 includes a plurality of sensors such as voltage sensors and temperature sensors located at various points of the battery. The voltage sensors may be located at cell connection points, such as the terminals, and the temperature sensors may be located at the cell connection points, on cell bodies, and in a cooling medium flow path, on a cold plate, on a cooling fin, and the like. The voltage sensors are configured to output a signal indicative of a sensed voltage, and the temperature sensors are configured to output a signal indicative of a sensed temperature. The signals may be sent to the controller that includes logic for interpreting these signals to determine temperatures and voltages. This will be described in more detail below. The traction battery may include a plurality of temperature sensors that are strategically placed to provide a holistic picture of the thermal condition of the battery. In one embodiment, each of the arrays 44 includes a dedicated temperature sensor. Alternatively, each of the modules 48 may include a dedicated temperature sensor. The temperature sensor may be a thermistor, thermocouple, or the like.

Figure 3:
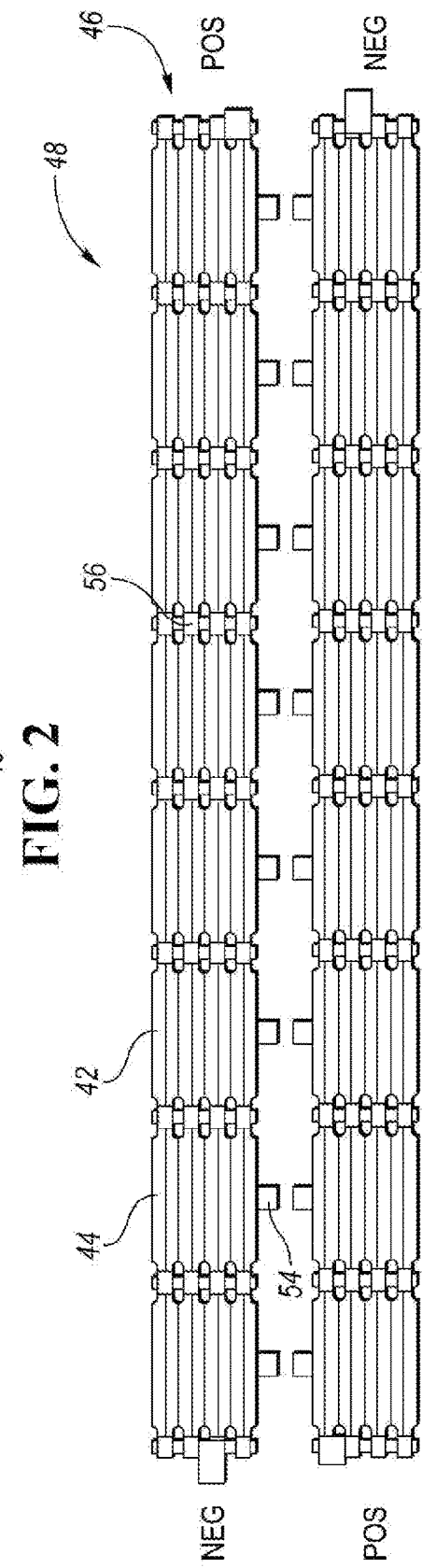
FIG. 3 is top view of a cell module of the battery of FIG. 2.

FIG. 3 illustrates a top view of an example module 48 according to one or more embodiments. In this example, each of the arrays 44 include an associated temperature sensor 54. The temperature sensor 54 may be configured to read a temperature of one of the cells 42, as shown, or may be configured to read a temperature of one of the terminals or terminal connections or coolant. The module 48 may also include a plurality of voltage sensors 56 that are located on the terminal connections. In this example, each of the arrays 44 also includes an associated voltage sensor 56. Thus, the module 48 is shown with 16 temperature sensors 54 and 16 voltage sensors 56. Of course, this is just one nonlimiting example, In other embodiments, the arrays may include a greater number of temperature sensors.

Figure 4:
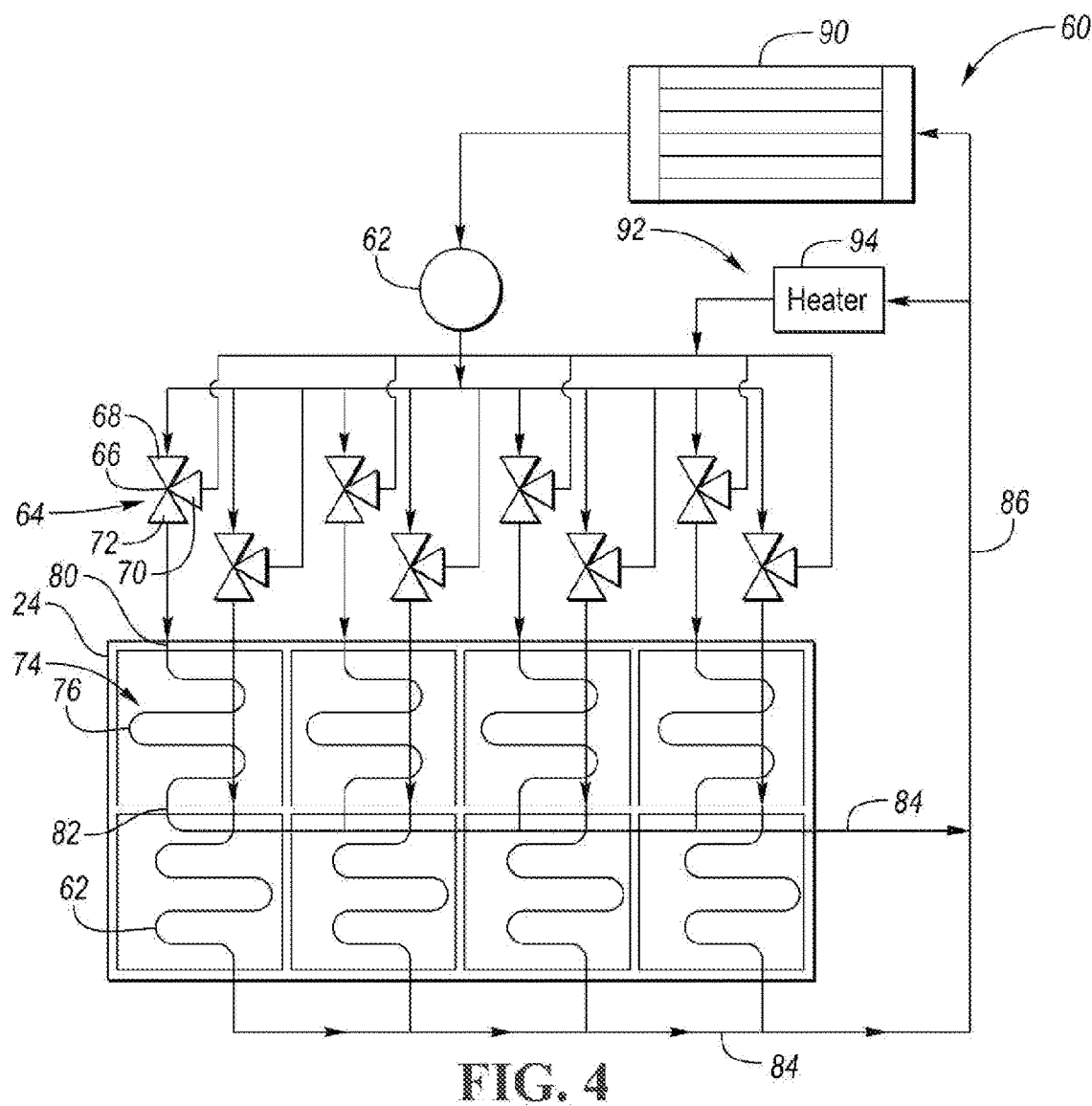
FIG. 4 is a diagrammatical view of a traction battery assembly having a traction battery and an associated thermal management system.

Referring to FIG. 4, the traction battery assembly 58 includes the traction battery 24 and an associated thermal management system that is configured to heat or cool the traction battery. The thermal management system may be a liquid-cooling system or an air-cooling system. In some embodiments, the liquid-cooling system is a closed system that includes a plurality of conduits and other components configured to circulate a liquid coolant though cold plates, fins, or the like to thermally regulate the cells without direct contact between the coolant and the cells. Here, the coolant may be an ethylene-glycol mixture. Alternatively, the liquid-cooling system may have a working fluid that directly contacts the battery cells. Here, the working fluid is a dielectric coolant that is capable of directly contacting the battery cells without conducting electricity. The dielectric coolant may be a dielectric oil.

Rather than thermally regulating the battery 24 as a single unit, the thermal management system may be configured to individually thermally regulate discrete zones 62 of the cells. In the illustrated embodiment, the traction battery 24 includes eight zones 62, but this is just an example, more or less zones may be used depending upon the size of the battery, the thermal uniformity of the battery, and other factors. The thermal management system is configured to individually control the flow rate and temperature of the coolant flowing through each of the zones based on readings from the temperature sensors 54. This increases the temperature homogeneity of the battery 24 to reduce hot and cold spots, which may provide improved performance and greater battery life.

In the illustrated embodiment, a liquid-based thermal management system 60 is used to thermally regulate the battery 24. Thermal management system 60 includes a pump 63 that feeds pressurized coolant to a manifold 64. The illustrated location of pump 63 is but one example, and the pump could be placed in other areas, such as on line 86. The manifold 64 may be internal or external to the traction battery 24. The manifold 64 may include a plurality of valves 66 each associated with one of the zones 62. In the illustrated embodiment, the zones 62 and the valves 66 are in equal number. The valves 66 may be three-way valves each having a first inlet 68 connected to the pump 63, a second inlet 70, and an outlet 72. The valves may be electronically controllable by the controller. The valves 66 are actuatable between at least a first position in which the inlet 68 is connected in fluid communication with the outlet 72, a second position in which the inlet 70 is connected in fluid communication with the outlet 72, and a closed position in which the outlet 72 has no flow. The size of the opening in the first and second positions can be modulated to increase and decrease the flow rate at the outlet 72. As will be described in more detail below, the controller 33 or other controller is configured to command the valves to the various positions based on sensed conditions.

Each of the zones 62 has a dedicated cooling circuit 74 configured to circulate the coolant across the cells of the zone to provide heating or cooling. The cooling circuit 74 may include conduit 76 that circulates the coolant therethrough. The conduit 76 may be packaged as part of a cold plate or other cooling structure. As discussed above, the cooling circuits 74 may also be direct-cooling circuits in which the coolant directly contacts the cells. Here, the cooling circuit may be defined by various passageways, channels, housings, or other structure that guide the coolant through the zones and across the cells directly. The cooling circuits 74 include inlets 80 connected to the outlets 72 and outlets 82 connected to an outlet manifold 84. While not explicitly discussed, additional conduit, such as tubes, hoses, pipes, or the like, are used to connect to the cooling circuit 74 with the valves 66 and the outlet manifold 84.

The outlet manifold 84 is connected to a return loop 86 of the thermal management system 60. The return loop 86 routes the coolant to a heat exchanger 90. The heat exchanger 90 is configured to dissipate heat from the coolant to another medium. The heat exchanger 90 may be a radiator configured to dissipate heat from the battery to the outside air. Alternatively, the heat exchanger 90 may be a chiller, i.e., a liquid-to-refrigerant heat exchanger, or a liquid-to-liquid heat exchanger. The chilled coolant exiting the heat exchanger 90 is routed back to the pump 63 for recirculation. The heat exchanger 90, the pump 63, and the conduit connecting the pump to the valve 66 may be referred to as a cooling loop.

The thermal management system 60 may also include a heating loop 92 that connects between the return loop 86 and the second and inlets 70 of the valves 66. The heating loop 92 may include a heater 94 such as an electric heater. The electric heater 94 may be electronically controlled by the controller. The heater 94 is configured to receive warmed coolant from the return loop 86, and, when energized, further heat the coolant provided to the valves 66. The heater 94 can be deenergized to simply recirculate the warm coolant from the return loop back through the battery creating a bypass loop for the heat exchanger 90.

The three-way valves 66, in combination with the cooling loop and the heating loop, enable the zones 62 to be independently heated and cooled at a same time. That is, some of the zones can be heated while other of the zones are simultaneously cooled. This may be done to simultaneously eliminate hot and cold spots and bring the battery 24 to a uniform temperature more quickly than relying on resistance heating from the battery cells to eliminate the cold spots.

While FIG. 4 is described as a liquid-cooling system, its teachings can be extended to an air-cooling system. For example, the heat exchanger 90 may be eliminated or change to an evaporator to provide the chilled air to the battery. The pump 63 may be modified to be a fan configured to force air through the manifold and into the circuits. In an air-cooled system, the manifold or the valves may be a housing with a series of blend doors and passageways configured to route air between the heated supply and the cooled supply.

Figure 5:
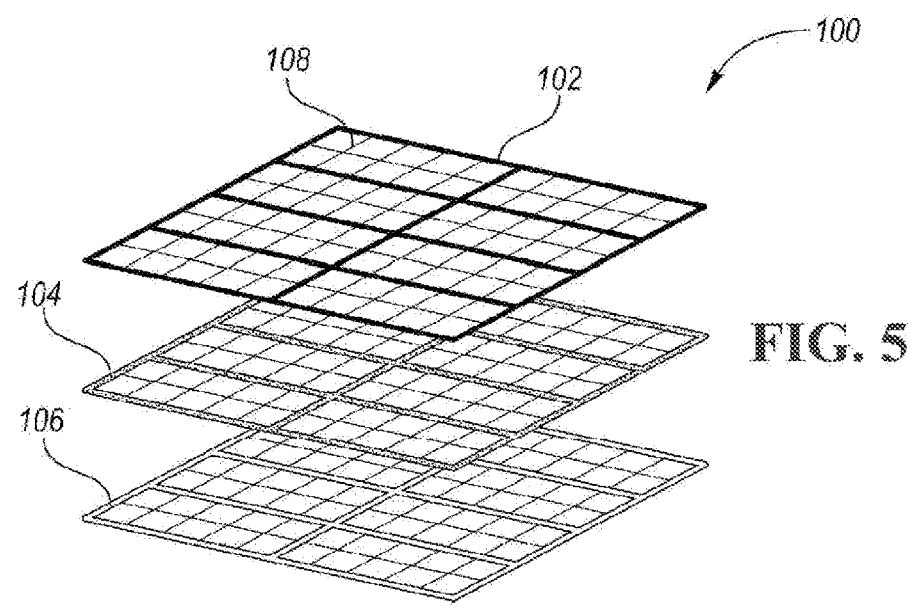
FIG. 5 is a diagrammatical view of another traction battery having multiple vertical layers of zones.

FIG. 5 illustrates another traction battery 100 that includes three vertical layers 102, 104, 106 of zones. Each of the layers includes a plurality of zones 108. Each of the layers may include its own inlet and outlet manifolds such as those described above. The layers may be powered by a single pump or may each have their own dedicated pump. This vertical layer arrangement may be used in traction batteries that include multiple vertical layers of cell arrays so that each of the cell arrays can continue to have a dedicated zone for cooling.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6:
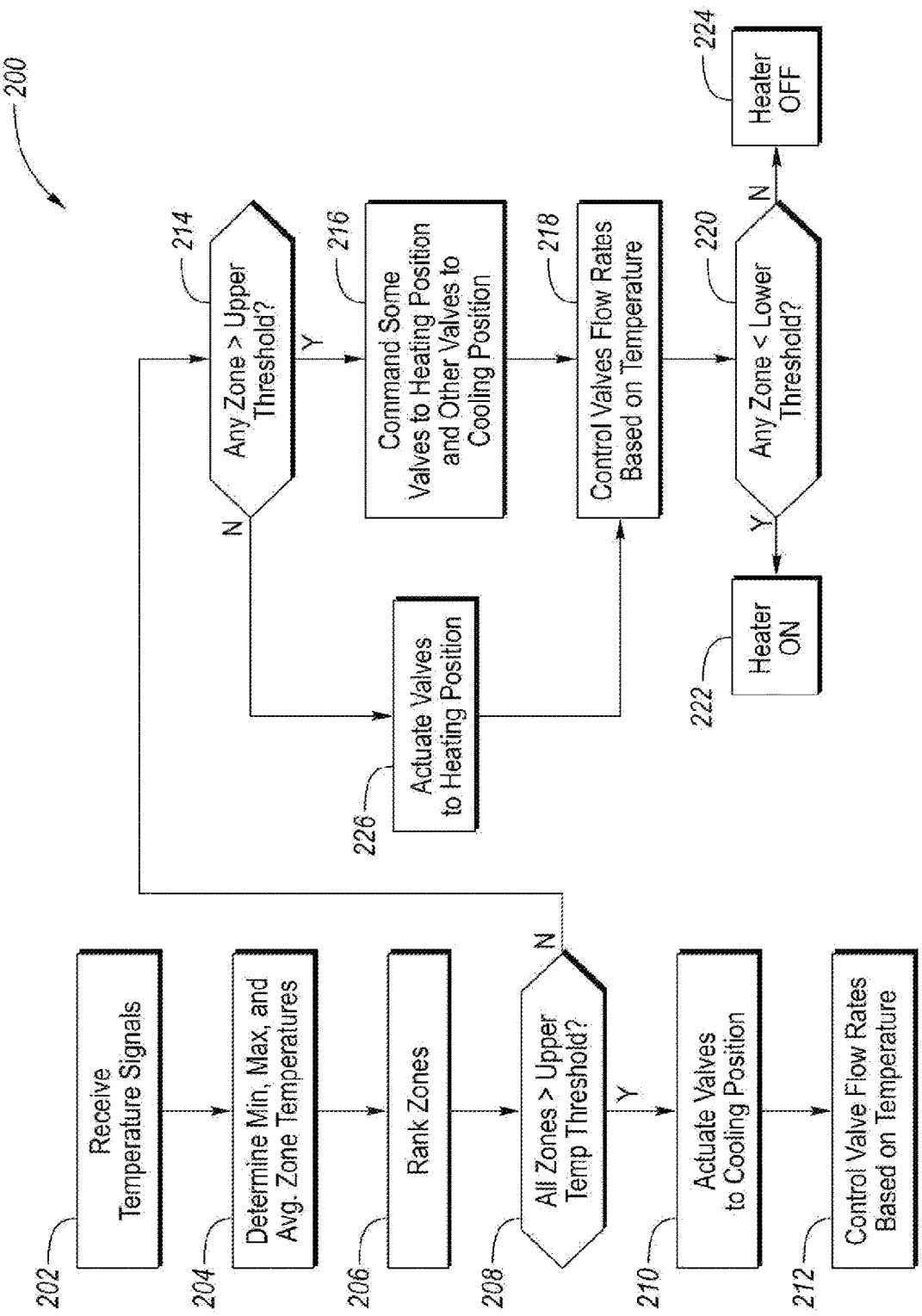
FIG. 6 is a flow chart of an algorithm for controlling a battery thermal management system.

FIG. 6 is a flowchart 200 of an algorithm for controlling a thermal management system of vehicle traction battery assembly. Control begins at operation 202 where the controller receives temperature signals from the various temperature sensors. As discussed above, the battery may include a temperature sensor for each zone allowing the controller to have a precise understanding of the temperature of each zone. At operation 204, the controller determines the minimum temperature, the maximum temperature and the average temperature for each of the zones. While each zone may only include a single temperature sensor, the readings from temperature sensors of adjacent zones as well as testing and calculations may be used to determine the minimum, maximum, and average temperatures for each of the zones.

At operation 206, the controller ranks the zones according to temperature, e.g. hottest to coldest or coldest to hottest. The ranking may be based on the average temperature of the zone, the maximum temperature of the zone, or the minimum temperature of the zone. At operation 208, the controller determines if all of the zones are greater than an upper temperature threshold. The upper temperature threshold indicates when cooling is required. If yes, control passes to operation 210 and the valves are actuated to the cooling position in which the inlets 68 are connected in fluid communication with the outlets 72.

The controller actuates the valve openings to modulate the flow rate through the zones based on the temperature readings at operation 212. For example, the controller reduces an opening of the valve associated with the coldest zone to reduce the flow rate therethrough and increases an opening of the valve associated with the hottest zone to increase the flow rate therethrough in order to reduce the temperature differential between these zones. The control may similarly modulate the openings of the other valves to promote temperature uniformity. The controller may include a feedback controller for the valves, such as a proportion integral (PI) controller. The controller may set a target temperature for the zones and individually control the circuit flow rates with the valves to reduce an error between a measured zone temperature and the target zone temperature. The controller may also modulate the pump 63 based on temperature. In some embodiments, the heat exchanger 90 may be controllable to increase or decrease the temperature of the discharged coolant feeding the pump. Here, the controller may control the heat exchanger based on the temperature error.

If no at operation 208, control passes operation 214 and the controller determines if any of the zones have a temperature greater than the upper threshold. A yes at operation 214 indicates that some of the cells require cooling while other cells do not. As such, the controller commands some of the valves to the heating position and others the valves to the cooling position at operation 216. More specifically, the valves associated with zones having a temperature greater than the upper threshold are commanded to the cooling position (e.g., the valves are actuated to connect the inlet 68 to the outlet 72), and the valves associated with zones having a temperature less than the upper threshold are commanded to the heating position (e.g., the valves are actuated to connect the inlet 70 to the outlet 72). In operation 218, the controller actuates the valves to control flow rates to the zones based on temperature readings as previously described. At operation 220, which may be simultaneous with operation 218, the controller determines if any of the zones are less than the lower threshold temperature. The lower threshold is a temperature that requires active heating, such as with the heater 94. If active heating is required, control passes to operation 222 and the heater is turned ON. If no, the heater is turned OFF or remains OFF at operation 224.

If none of the zones are greater than the upper threshold at operation 214, all of the valves are actuated to the heating position at operation 226. Control then passes back to operation 218 as discussed above.

In addition to controlling the valves, the temperature sensors may be used to identify faulty temperature sensors. For example, an outlier temperature reading, if received consistently, may indicate a faulty temperature sensor, sensor connection, or a high resistance cell connection, e.g. for connection to terminal. The controller may be configured to flag such a sensor and filter out that sensor from being used during control of the thermal management system. The controller may also be configured to issue a code or flag indicating the faulty temperature sensor.

The voltage sensors may be used to determine the internal resistance of the cells and connections. For example, voltage differences in a battery pack can be measured and compared. The controller may receive a voltage reading for a cell and a voltage reading for both the immediately preceding and immediately proceeding cells. If the voltage difference between these measurements points deviates by more than a threshold, diagnostics are commenced. The diagnostics may include measuring the temperature of these three cells and comparing. If the cell has a temperature that is greater than the preceding and proceeding cells by a threshold, this indicates that the cell may have experienced increased resistance and the controller may issue a flag. If the temperature differential is greater than the threshold, this may indicate the cell is experiencing increased internal resistance or excessive age and a flag may be issued. This may also indicate a loose cell connection between the three cells, which may also trigger a flag.

As described above, the zonal thermal management in conjunction with the plurality of temperature sensors and/or voltage sensors may be used to increase temperature uniformity within the traction battery as well as provide diagnostics for determining faulty conditions of the battery.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   a traction battery including a plurality of cells; and
   a thermal management system including:
      a plurality of distinct circuits each associated with a different subset of the cells and having conduit configured to circulate coolant therethrough, and
      valves each having a first inlet connected to a heating loop, a second inlet connected to a cooling loop, and an outlet connected to a corresponding one of the circuits, wherein each valve includes a first position in which the outlet and the first inlet are in fluid communication to provide heating and a second position in which the outlet and the second inlet are in fluid communication to provide cooling.

2. The traction battery assembly of claim 1, wherein the conduits extend through the traction battery.

3. The traction battery assembly of claim 1, wherein the heating loop includes an electric heater and the cooling loop includes a heat exchanger.

4. The traction battery assembly of claim 1, wherein each of the circuits includes an inlet connected to the outlet of an associated one of the valves and an outlet connected to a return loop of the thermal management system, wherein the cooling loop includes a pump, and the heating loop connects the return loop to the second inlets.

* * * * *